United States Patent [19]

Ishibashi et al.

[11] 4,281,909
[45] Aug. 4, 1981

[54] MODULAR CAMERA SYSTEM

[75] Inventors: Takao Ishibashi, Higashiyamato; Kenjiro Osonoi, Tokorozawa, both of Japan

[73] Assignee: Osawa Precision Industries, Ltd., Tokyo, Japan

[21] Appl. No.: 39,993

[22] Filed: May 17, 1979

[30] Foreign Application Priority Data

May 22, 1978 [JP] Japan .................................. 53-060058

[51] Int. Cl.³ ....................... G03B 31/00; G03B 19/18
[52] U.S. Cl. .................................... 352/25; 352/91 S; 352/136; 352/140; 354/288
[58] Field of Search ................. 352/25, 136, 244, 168, 352/242, 91 C, 91 S, 91 R, 131, 140, 174; 354/75; 361/392-394

[56] References Cited

U.S. PATENT DOCUMENTS 3,940,777  2/1976  Komine ................................. 354/197

FOREIGN PATENT DOCUMENTS 52-7726  1/1977  Japan ....................................... 352/136

Primary Examiner—L. T. Hix
Assistant Examiner—Stafford D. Schreyer
Attorney, Agent, or Firm—Robert E. Wagner; Ralph R. Rath

[57] ABSTRACT

A modular camera system includes a basic camera having an image forming optical system, image focal plane arrangement, and predetermined imaging and camera functions. The modular camera system further includes modules that are selectively attachable and connectable to the basic camera for providing additional camera and imaging functions and controls. The module includes appropriate module control circuitry for controlling the operation of the basic camera concerning predetermined camera and imaging functions when the module is attached to the basic camera to form the modular camera system.

16 Claims, 9 Drawing Figures

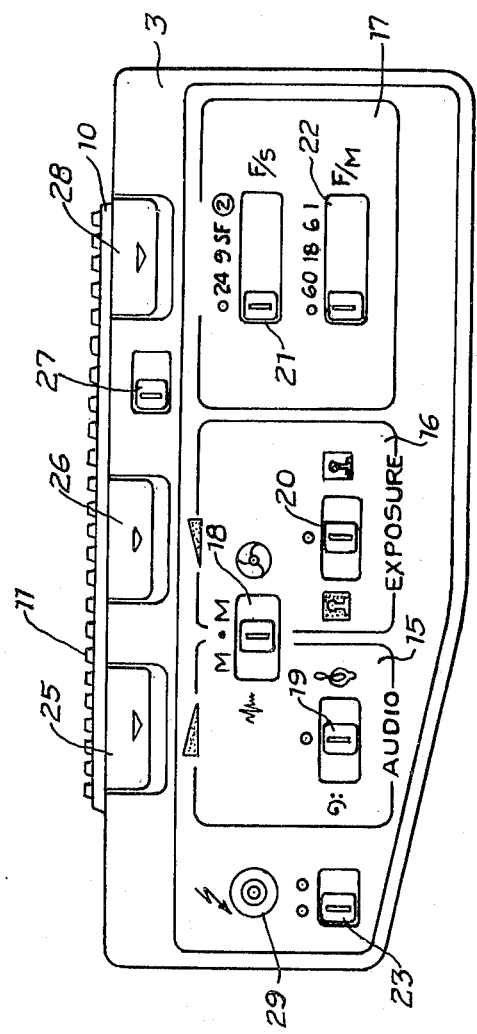
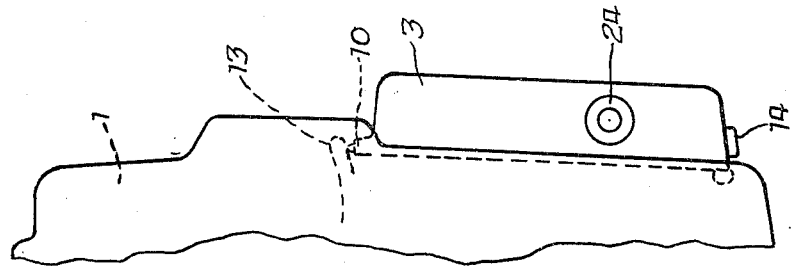

MODULAR CAMERA SYSTEM

BACKGROUND OF THE INVENTION

1. Field of the Invention

The present invention relates generally to camera and imaging apparatus and more particularly to a modular camera system comprising a basic camera for operation in accordance with predetermined imaging and camera functions and selectively attachable modules for providing control of additional camera functions.

2. Description of the Prior Art

Typically the control portions of cameras are built into the camera body and define and limit the control functions and usages of the camera. Thus, it is normally very impractical to add or remove any camera functions to or from the camera body at a later date. Further and concerning sound recording and cinecameras, the control functions of the camera become highly complicated and a camera user must purchase different cameras as different functions are desired. Thus, conventional cameras are not adapted for add on capabilities and the camera user has only one option and that is to buy up to more expensive, more sophisticated cameras when additional functions are desired.

A modular camera or camera system is disclosed in U.S. application Ser. No. 943,429, abandoned, filed by Richard K. Carlson on Sept. 8, 1978 wherein a main camera provides a plurality of standard photographic functions and the main camera is designed to provide additional, more sophisticated photographic and sound recording features as selected by function controls provided on a plurality of attachable or snap-in modules that may be subsequently acquired by the camera user as his photographic techniques or applications require. The modules disclosed therein provide function selection capability for producing fades of the exposure and/or sound recording, slow motion, auto exposure override, variable film speed, and lap dissolves, as well as other features.

Japanese Patent Application SH053-33626 describes a cinecamera having a micro-computer utilized to control the functions of the camera. In this disclosure, the micro-computer is also built into the camera body and the control portions or functions are fixed and not adaptable and are a permanent part of the camera body.

SUMMARY OF THE INVENTION

Accordingly, it is an object of the present invention to provide a basic camera having an image forming optical system, an image focal plane arrangement and predetermined imaging and camera functions with selectively attachable and connectable modules for providing additional camera and imaging function controls with the modules including module control apparatus for controlling the operation of the basic camera concerning the predetermined camera and imaging functions when the modules are attached to the basic camera.

It is another object of the present invention to provide a modular camera system wherein a basic camera includes a first CPU for control of the camera functions of the basic camera and selectively connectable modules including a second CPU for control of the camera functions of the basic camera upon connection of the module to the basic camera.

These and other objects will become apparent from the following disclosure taken in conjunction with the accompanying drawings.

BRIEF DESCRIPTION OF THE DRAWINGS

FIG. 2 is a partial front elevational view of the modular camera system of FIG. 1;

FIG. 3 is an enlarged elevational view of one of the attachable modules of FIG. 1;

DESCRIPTION OF THE PREFERRED EMBODIMENT

Figure 1:
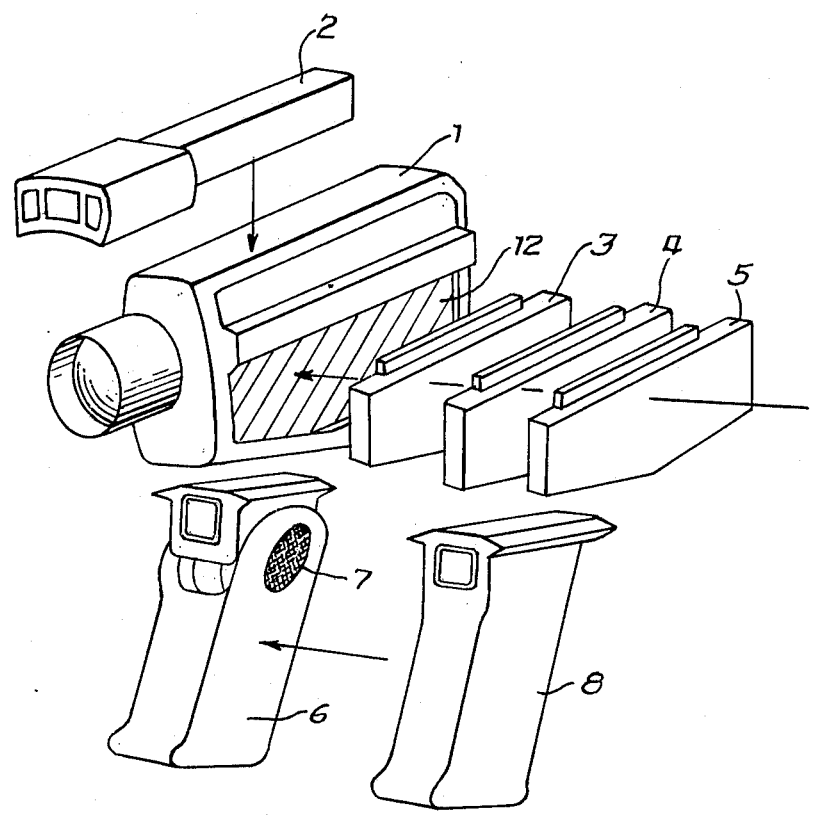
FIG. 1 is a perspective view of a modular camera system in accordance with the present invention illustrating various modules attachable to a basic camera.

Referring now to FIG. 1, there is illustrated a modular camera system constructed in accordance with the principles of the present invention. A basic camera 1 having a camera housing includes conventional camera features and functions including a focusable lens or other image forming optical lens system and other camera and imaging functions to be described in more detail hereinafter. In one preferred embodiment of the present invention, the camera 1 is a cinecamera having sound recording capabilities although it should be understood that the present invention is also applicable to video cameras and the like. Further, the present invention is also applicable to still cameras.

The basic camera 1 is adapted to accept selectively attachable modules incorporating controls and functions as to camera imaging and camera functions for control of the basic camera 1 in accordance with the attached modules and controls. For example, an auto focus module 2 upon attachment to the top portion of the housing of the basic camera 1 controls the automatic focusing of the camera image focusing lens system of the basic camera 1.

Various control modules referred to generally at 3, 4 and 5 are each capable of attachment and connection, one at a time, to a sidewall portion of the housing of the basic camera 1 to control camera imaging and camera functions of the basic camera 1 in accordance with the control apparatus and control functions included within the particular module that is attached to the basic camera 1. For example, the modules 3, 4 and 5 in specific embodiments include control of camera functions such as film feeding control, exposure control or image illumination brightness level control, automatic focus adjusting, lap dissolve control features, and other camera imaging and recording functions as will be explained in more detail hereinafter in connection with the detailed discussion of the modules 3, 4 and 5. The basic camera 1 is an operational camera system independent of the attachable modules 2, 3, 4 and 5 and operates in accordance with predetermined basic camera functions.

The modules 3, 4 and 5 are fabricated so as to control all or a predetermined number of the functions of the basic camera 1 and modular camera system. Thus, the particular module is selected by the camera user based upon the particular features and functions desired by the camera user to supplement the basic functions of the basic camera 1.

The basic camera 1 includes structure for the attachment of a pivotal hand grip 6 pivotable about an axle 7 or a fixed hand grip 8 at the option of the camera user.

Referring now additionally to FIGS. 2 and 3, the modules 3, 4 and 5 are selectively attachable and connectable to control the basic camera 1 by the interfitting of the module, for example, module 3 in FIG. 2, with cooperating structure of the camera housing of the basic camera 1. A projecting portion 10 of the module 3 includes a multiple contact connector 11 arranged to complete an electrical connection to the corresponding multiple contact connector 13 carried by the basic camera 1 for electrical connection of the module 3 into the basic camera 1 to form the modular camera system.

A locking device 14 or other suitable arrangement is provided along the bottom portion of the housing sidewall of the basic camera 1 to interfit with the corresponding bottom portion of the module 3 so as to firmly retain the module 3 upon attachment to the basic camera 1.

The module 3, referring now additionally to FIG. 3, includes various function switches, buttons and selectors to control the camera and imaging functions of the modular camera system when the module 3 is attached to the basic camera 1. The module 3 includes a sound control portion 15, an exposure control portion 16 and a film speed control portion 17. An auto-manual changeover selection slide switch 18 includes a center position as shown in FIG. 3 wherein the functions of the basic camera 1 are controlled by the exposure control portion 16 and the sound control portion 15 of the module 3. The switch 18 is positionable to a right side position for manual operation and override of the exposure control portion 16 referred to as a manual position for the exposure control function and operates in accordance with the manual control settings or fixed control settings of the basic camera 1. When the switch 18 is positioned to a left side position, the exposure control portion 16 is functional and the sound control function of the portion 15 is in a manual mode. A noise limit switch 19 of the sound control portion of the module 3 is positionable from a center normal position to low or high frequency noise limiting positions.

The exposure control portion 16 of the module 3 includes a front or back light changeover switch positionable between a front light shooting or back light shooting position from a normal center position.

The film speed control portion 17 of the module 3 includes a film transport speed selection switch 21 which is positionable to a predetermined number of frame selection speed settings. For example, the frame selection speed settings are calibrated in film speeds of frames per second and include a normal film speed of 18 frames per second (f/s) in a first switch position and 24 f/s, 9 f/s, 2 f/s or single frame per trigger pole film rate positions. The single frame speed operates to expose a single frame of film each time the camera user operates the trigger control of the hand grip 6 or 8 attached to the basic camera 1 as explained in more detail hereinafter. The film speed control portion 17 also includes a timer selection arrangement 22 providing additional film speed control and includes various settings in frames per minute; for example 60, 18, 6 and 1 frame per minute operation. The selection arrangement 22 is operable when the selection switch of arrangement 21 is in the single frame position.

The module 3 also includes a cue light switch for operation of an indicator 24 on the side of the module 3 whenever the trigger run switch of the handle grip is actuated. A pair of manually depressable buttons 25 and 26 control fade-in or fade-out, respectively, in accordance with the set position of the auto-manual changeover switch 18. For example, in the center position of the changeover switch 18, a fade-in or fade-out is selected upon operation of the buttons 120, 122 of both the sound and image control functions of the camera.

A changeover slide switch 27 is provided on the module 3 for control of the selection of slow motion or lap dissolve functions. A manually depressable button 28 is provided on the module 3 to actuate a slow motion or a lap dissolve mode dependent upon the position of the switch 27.

Figure 4:
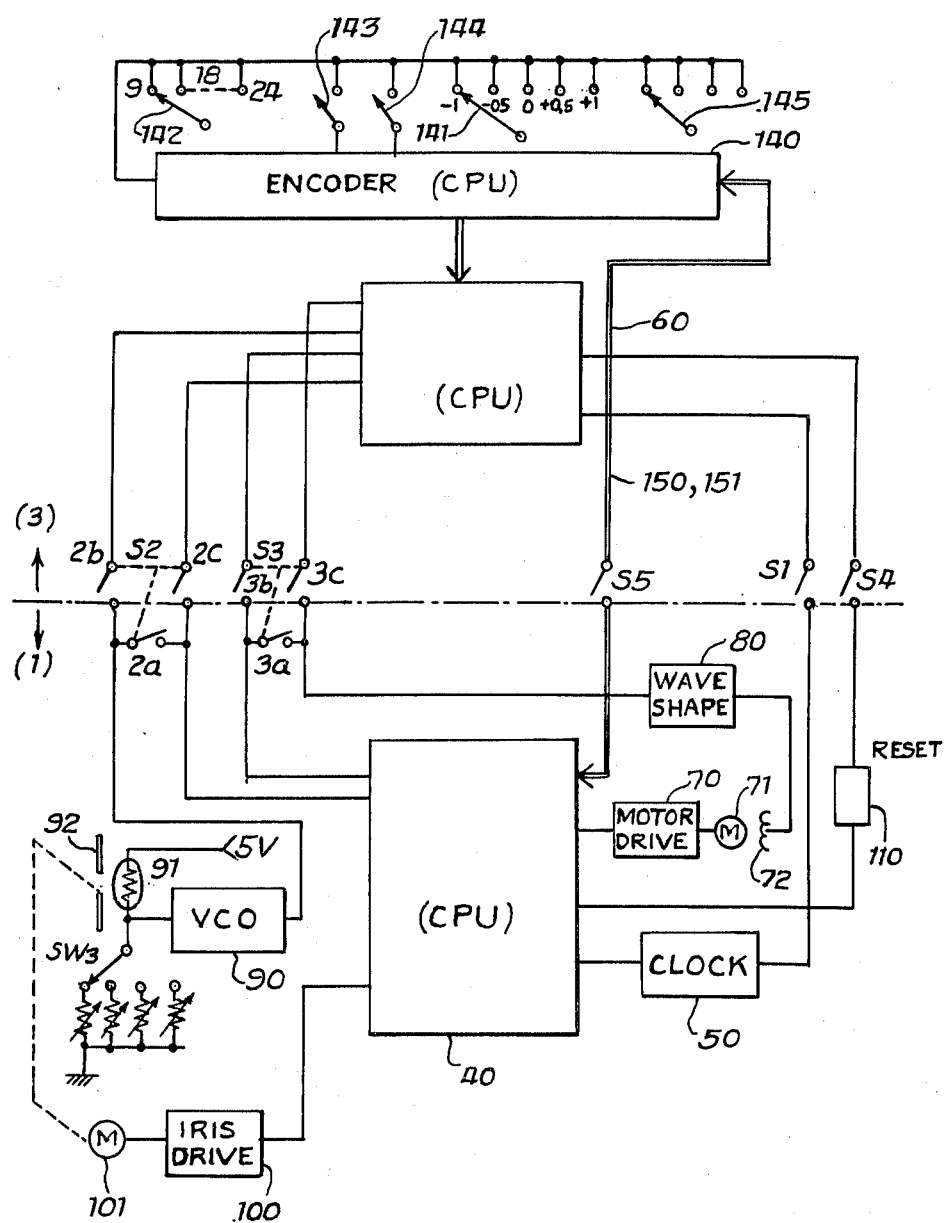
FIG. 4 is a block diagram representation of the control arrangements of the basic camera and one of the attachable modules.
Figure 5:
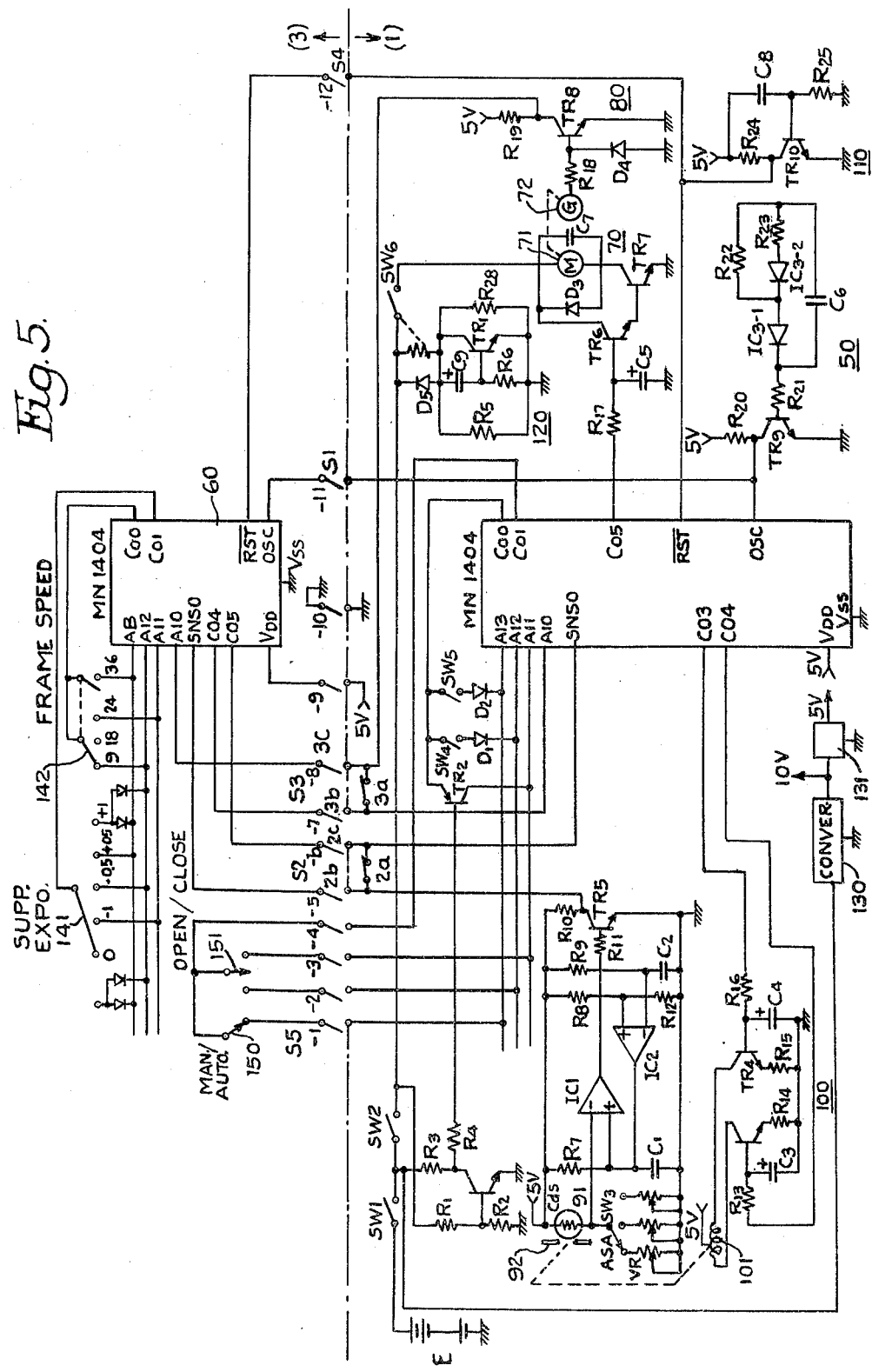
FIG. 5 is a detailed logic and electrical schematic drawing of the control apparatus of FIG. 4.

The control circuits, features, and arrangements of the module 3 and the basic camera 1 are interconnected to form the module camera system of the present invention as shown in FIGS. 4 and 5 and are illustrative of a preferred embodiment of the basic camera 1 and the module 3. The control circuitry and arrangements of other modules such as modules 4 and 5 include similar types of control arrangements having either fewer or additional control functions and features. In FIGS. 4 and 5, the dashed line represents the connection interface of the module 3 to the basic camera 1 through the multiple contact connectors 11 and 13 represented in FIG. 4 by the switches S1–S5 and represented in FIG. 5 by the connector contacts 11-1 to -13 and 13-1 to -13 of the connectors 11 and 13.

Considering now the control circuitry of the basic camera 1, a central processing unit (CPU) 40 is provided for the basic control functions of the basic camera 1 when no module, such as module 3, 4 or 5, is attached and connected to the basic camera 1. For example, the CPU 40 is a type number MN1404 device manufactured by Matsushita Electric Co., Ltd.

The timing of the CPU 40 is controlled by the output of a clock pulse generating circuit 50. The clock pulse generating circuit includes integrated circuit gates IC3-1 and IC3-2, transistor TR9, resistors R20–R23 and capacitor C6. The clock pulse timing signal output of the clock pulse generating circuit 50 is used as the timing control for the module 3.

The module 3 includes a CPU 60 and the timing clock pulse output of the clock pulse generating circuit 50 is connected through a switch S1 to the oscillator input OSC of the CPU 60 of the module 3. The switch contact S1 is closed or turned on when the module 3 is attached to the basic camera 1 as explained hereinbefore. The output of the clock pulse generating circuit 50 is also connected to the OSC terminal of the CPU 40.

A motor driving circuit 70 of the basic camera 1 controls a film feeding motor 71. The motor driving circuit 70 includes a resistor R17, a capacitor C5, two transistors TR6 and TR7, a diode D3 and a capacitor C7 with the base of the transistor TR6 being connected to the CO5 output terminal of the CPU 40 through the resistor R17. The CO5 output terminal of the CPU 40 generates a signal to control the speed of the motor 71.

The speed of the film feeding motor 71 is sensed or detected by a tachometer 72 that generates an output wave form representing the speed of the motor 71. The output of the tachometer 72 is connected to a wave form shaping circuit 80. The wave form shaping circuit 80 includes a resistor R18, a diode D4, a transistor TR8 and a resistor R19. The output of the tachometer 72 is connected through the resistor R18 to the base of the transistor TR8. The collector of the transistor TR8 forms the output of the wave form shaping circuit 80 and is connected to the A10 terminal of the CPU 40 and to the A10 terminal of the CPU 60 through switch contacts 3C of a switch S3 when the module 3 is attached to the basic camera 1 so as to close the contact 3C. When the module 3 is not attached to the basic camera 1, the 3A switch contact of switch S3 is closed to connect the output of the wave form shaping circuit 80 to the terminal A10 of the CPU 40. Switch contact 3B of the switch S3 is also closed when the module 3 is attached to the basic camera 1.

A voltage controlled oscillator (VCO) 90 of the basic camera 1 includes two integrated circuit amplifiers IC1 and IC2, resistors R7–R12, capacitors C1 and C2, transistor TR5, sensor cell CdS 91 and a variable resistor arrangement VR. The VCO 90 provides an output signal that varies in pulse width or frequency in accordance with the change of resistance of the sensor cell CdS 91 and in accordance with the resistance selected by the variable resistor arrangement VR. The variable resistor VR is selected by the switch SW3 according to, for example, the ASA sensitivity of the film or film cartridge loaded into the basic camera 1. For example, the switch SW3 may be controlled in accordance with keyed interfitting arrangements of the inserted film cartridge to actuate the switch SW3 to the appropriate resistance of the variable resistor arrangement VR.

An iris arrangement 92 is provided in front of the sensor cell CdS 91 and is controllable by rotation of the motor M1 of an iris driving circuit 100. When the iris 92 is controlled to be opened to allow a higher illumination or image level, the resistance of the sensor cell CdS 91 decreases. The sensor cell CdS 91, for example, is a cadmium sulfide cell. As the resistance of the sensor cell CdS 91 decreases, the input voltage to IC1 increases with a resultant increase in the pulse width of the output of the VCO 90 or decrease in the frequency of the output signal.

Correspondingly, when the iris 92 closes, the pulse width of the VCO 90 decreases. The output of VCO 90 is connected to the SNSO terminal of the CPU 40 through the switch contact 2A of a switch S2 when the module 3 is not attached to the basic camera 1. The output of the VCO 90 is also connected to the switch contact 2B of the switch S2 to the SNSO terminal of the CPU 60 of the module 3 when the module 3 is connected to the basic camera 1 so as to actuate the switch S2, and close the switch contact 2B and open the switch contact 2A. By attachment of the module 3 to the basic camera 1, a switch contact 2C of switch S2 is also closed.

The iris driving circuit 100 includes two transistors TR3, TR4, resistors R13–R16 and capacitors C3 and C4. The iris driving circuit 100 is controlled by the logic state of two output terminals CO3 and CO4 of the CPU 40. When the CO3 terminal is in a set condition and the CO4 terminal is in a reset condition, the transistor TR4 is rendered conductive and the transistor TR5 is turned off. The transistor TR5 is non-conducting or turned off and the iris 92 is driven in an opening direction. Correspondingly, when the CO4 terminal is in a set condition, the iris 92 is driven in a closing direction. When both the CO3 and CO4 terminals are in a reset condition, the transistors TR3 and TR4 are off and the iris 92 is not driven and remains in a stable, fixed condition. A reset circuit 110 including a transistor TR10, two resistors R24, R25 and a capacitor C8 is provided in the basic camera 1 for controlling the timing of the initial reset of the module 3 and the basic camera 1. The reset of the CPU 60 of module 3 is controlled by the reset circuit 110 through a switch S4 that is closed by attachment of the module 3 to the basic camera 1.

A solenoid driving circuit 120 of the basic camera 1 (shown only in FIG. 5) includes a transistor TR1, three resistors R5, R6 and R8, a capacitor C9 and a diode D5. The solenoid driving circuit 120 operates a switch SW6 connected to control a battery supply E to the film driving feeding motor 71. A pre-run switch SW1 and a run SW2 are connected in series between the positive side of the battery supply E and through the switch SW6 to supply one side of the motor circuit 71 in the motor driving circuit 70. The solenoid driving circuit 120 is also arranged to control the shutter of the basic camera 1 to a predetermined closed position when the switch SW6 is open or off.

A film loop sensor switch SW4 is provided in the basic camera and is connected between the CO0 terminal of the CPU 40 and through a diode D1 anode to cathode to the terminal A12 of the CPU 40. The switch SW4 is closed or turned on when the film loop exceeds a predetermined loop size in accordance with the operation of a film feeding function; i.e., intermittent film feeding speed versus the uniform film feeding speed.

Through terminal A12, the CPU 40 generates an output signal at CO5 to control the intermittent film feeding speed to maintain the film loop within a constant loop size. A switch SW5 is actuated by insertion of a sound film cartridge into the basic camera 1 to control the film feeding at a constant speed when utilizing a sound film cartridge. The switch SW5 is connected between the CO0 terminal of the CPU 40 and through a diode D2 anode to cathode to the terminal A13 of the CPU 40.

A converter 130 generates a 10 volt supply reference from the input battery supply E as switched through the switch SW1. A constant voltage regulator 131 supplies a five volt supply reference suitable for operation of the integrated circuit device and the CPU 40 and the CPU 60.

Considering now the details of the module 3, the CPU 60 of the module 3 includes an encoder stage 140 including switches for exposure control value, ASA sensitivity value, frame speed control, front or back light control parameters and other camera and imaging control functions. The various functions are encoded by the encoder 140 into a suitable input data format to the CPU 60. As shown in FIGS. 4 and 5, for example, exposure switch 141, frame speed switch 142, front light switch 143, back light switch 144, and ASA sensitivity setting switch 145 include the various function control switches that may be provided for input to the CPU 60 through the encoder stage 140. The supplemental exposure switch 141 is utilized to increase or decrease the exposure level by a predetermined factor upon operation of the control switch 141. The frame speed switch 142 includes switch positions to select one of 9, 18, 24 or 36 frames per second upon operation of the switch 142. The module 3 also includes manual exposure control switches 150 and 151 utilized to open or close the iris 92 according to the position of the manual or auto switch 18 of FIG. 3. When the switch 18 is in the manual position, the switches 150 and 151 sense whether the iris 92 is to be opened or closed. Switch contacts -1 and -2 of the switch S5 are open when the module 3 is connected to the basic camera 1 and switches 2A and 3A of switches S2 and S3 respectively are closed when the module 3 is detached from the basic camera 1 and opened when the module 3 is attached to the basic camera 1.

Upon operation of the modular camera system, the reset circuit 110 resets the CPU 40 of the basic camera 1 and the RAM memory of the CPU 40 is addressed for appropriate readout and function control of the manual speed exposure, motor control speed including that for simultaneous sound recording, exposure control and other camera and imaging functions in accordance with the stored information in the RAM. When the exposure is controlled on a manual basis, terminals CO3 and CO4 of the CPU 40 are reset and both the transistors TR3 and TR4 of the RAM driving circuit 120 are rendered non-conductive so that the coil 101 for driving the iris 92 is not moved or driven and the iris remains stationary. When the selector switch 18 is in the manual position and the iris 92 is to be opened or closed as sensed by the switches 150, 151 of the control button 25, terminal CO3 or CO4 is set according to the particular associated address initially set in the RAM. When the terminal CO3 is placed in a set condition, the capacitor C4 is charged and the transistor TR4 is rendered conductive with current flowing through the iris driving coil 101 and the iris is moved to be opened. When the terminal CO4 is placed in a set condition, the iris 92 is moved to be closed in accordance with the predetermined drive control signals from the CPU 40 at the terminal CO4. When no indication of opening or closing the iris 92 is sensed by the switches 150, 151 but the selector switch 18 is still in the manual position, the CO3 and CO4 terminals are reset and the iris 92 remains stationary.

Considering the automatic exposure control, as discussed hereinbefore, the sensor cell CdS 91 in response to received illumination intensity at the film plane controls the pulse width at the output of the VCO 90 with the output of the VCO 90 being fed to the CPU 40 through switch 2A when the module 3 is not attached to the basic camera 1. In the CPU 40, the pulse width of the output of the VCO 90 is detected and digitally counted and compared with a reference constant stored at a predetermined address in the RAM of the CPU 40. The CPU 40 generates a signal to open or close the iris 92 according to the result of the comparison between the reference constant and the pulse width of the output of the VCO 90.

Figure 6:
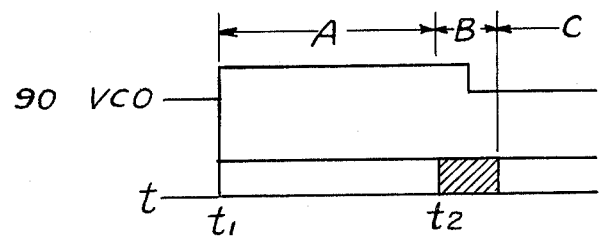
FIGS. 6, 7, 8(a)-8(f), and 9(a)-9(j) illustrate representative wave forms of various control signals at designated locations of the control apparatus of FIGS. 4 and 5 of the modular camera system.

Referring now to FIG. 6, the output pulse of the VCO 90 is counted beginning at time t1 and ends at time t2 defining a time interval A. If the output of the VCO 90 is low at the time t2, the iris 92 is opened by placing the terminal CO3 in a set condition. When the output of the VCO 90 is a low level within the time interval B after time t2, the CO3 and CO4 terminals are reset with the iris stationary to avoid hunting; i.e., to avoid the situation wherein the iris would continually open and close corresponding to a pulse width variation of the VCO output 90 varying between a high and low condition and a small pulse width timing difference about time t2. If the output of the VCO 90 goes to a low level during the time interval C beyond the timing intervals A and B, the terminal CO3 is reset and the CO4 terminal is placed in the set condition and the iris 92 is moved in a closing direction. Thus, the iris 92 is controlled automatically in accordance with the comparison of the pulse width of the output of the VCO 90 and the reference pulse width stored at a RAM address representing a desired reference illumination intensity at the film plane.

When the module 3 is attached onto the basic camera 1, the switch contact 2A of the switch S2 is opened and the switch contacts 2B and 2C of the switch S2 are closed and the output of the VCO 90 is connected to the SNSO input of the CPU 40. Upon attachment of the module 3 to the basic camera 1, the supplementary exposure control, front or back light control and the setting of the ASA sensitivity is obtained through switches 141, 143 and 145.

The exposure control function of the module 3 modifies the automatic exposure control function of the CPU 40 of the basic camera 1. Thus the CPU 60 modifies the pulse width from the VCO 90 to the basic camera 1 in accordance with the parameters of the encoded data and with respect to the references set into the module 3. The modified pulse width of the output of the VCO 90 is connected through the outut CO5 of the module 60 through the switch 2C of the switch S2 to the SNSO input of the CPU 40. For example, when a back light control is provided and is operational in the module 3, the iris 92 must be moved in an opening direction. Thus the pulse width from the VCO 90 of the basic camera 1 is modified so as to be narrowed and returned as a modified signal to the SNSO input of the CPU 40. In response to the narrowed pulse width of the VCO 90 coming from the module 3, the iris 92 is opened resulting in a lower resistence of the light receiving element, the sensor cell CdS 91. Consequently, the iris 92 is opened to the extent which corresponds to the modified narrowed pulse width of the VCO signal 90 as modified by the module 3.

Figure 7:
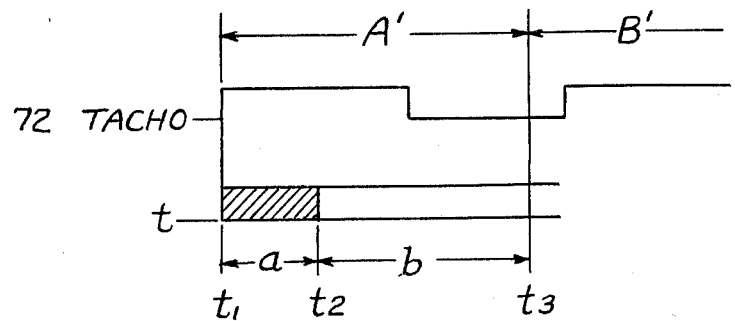

Considering now the film feeding motor 71 of the basic camera 1, the normal film feeding speed is 18 frames per second and the film feeding speed is controlled by the basic camera 1 to be a constant 18 frames per second. When the switches SW2 and SW6 are actuated, the CPU 40 senses the type of film used and the status of the film loop when a sound film cartridge is loaded by means of the sensing of the sound switch SW5 and the loop switch SW4. The speed control of the film feeding motor 71 is accomplished such that the output frequency of the tachometer 72 is constant. Referring now to FIG. 7, the period of the output signal of the tachometer 72 processed by the wave form shaping circuit 80 is compared to the reference timing signals by the CPU such that if the period of the tachometer signal falls within the time interval A', the CO5 terminal is reset so as to generate a stop signal to the motor 71. When the period of the tachometer signal is beyond the time interval A' and is in the time interval B', the CO5 terminal is set so as to generate a drive signal to the motor 71.

Thus the speed of the motor 71 is controlled in accordance with the reference established in the CPU 40. The time reference level A' is made up of the sum of the time interval a according to the result of the loop sensing and the time interval b based on the reference speed of 18 frames per second of the motor. The time interval a decreases when the film loop is in excess of the predetermined loop size and increases when the film loop is less than the predetermined loop size.

When the module 3 is attached to the basic camera 1, the switch S3 connects the output of the wave form shaping circuit 80 to the CPU 60 at the terminal A10 to the module 3. Thus, the period of the signal at the output of the wave form shaping circuit 80 corresponding to the tachometer output signal is modified by the CPU 60 in accordance with the programmed and controlled parameters of the encoded data according to the frame per second setting selected on the module 3. The modified signal is returned from terminal CO4 of the CPU 60 through the switch contact 3B to the A10 terminal of the CPU 40.

Figure 8:
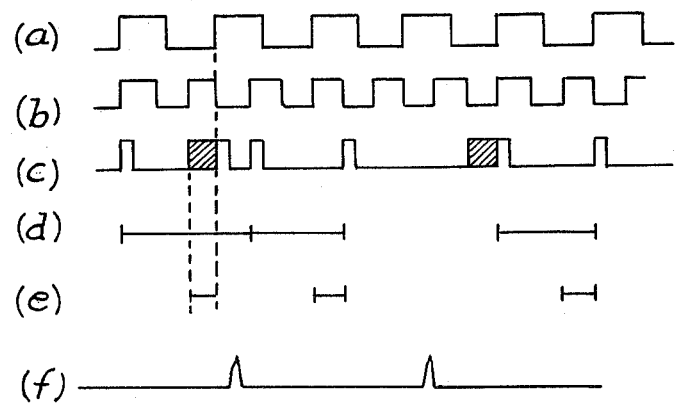

For example, if the frame speed of 24 frames per second is selected on the module 3, the CPU 60 of the module 3 modifies the period of the outut signal from the wave form shaping circuit 80 to be of a longer period and the modified increased period signal is returned to the basic camera 1 of the CPU 40. Accordingly, the basic camera 1 in accordance with the increased period signal interprets the increased period signal as the slowing down or below reference speed of operation of the film drive motor 71. Therefore, the CPU 40 through output terminal CO5 increases the speed of the motor 71 until the period of the signal generated by the tachometer 72 is narrowed to the extent that when modified to be increased by the CPU 60, the signal input at the CPU 40 is the standard reference period duration. The output wave form from the tachometer generator 72 through the wave form shaping circuit 80 is illustrated in FIG. 8 for various film feeding speeds. For example, an 18 frame per second film feeding rate is shown in FIG. 8(a) and a film feeding rate of 24 frames per second is shown in FIG. 8(b). The wave form of FIG. 8(b) corresponds to 24 frames per second and is modified by the CPU 60 of the module 3 by the duration shown in FIG. 8(e) so that the pulse width of FIG. 8(c) is inputted to the basic camera 1. Since the pulse width of the signal from the wave form shaping circuit 80 is modified by the module 60, the phase of the output pulse of the CPU 60 is distorted. Thus, the correctly synchronized pulses only are fed to the basic camera 1 so as to correctly select and count only the modified pulse width in the proper phase.

Figure 9:
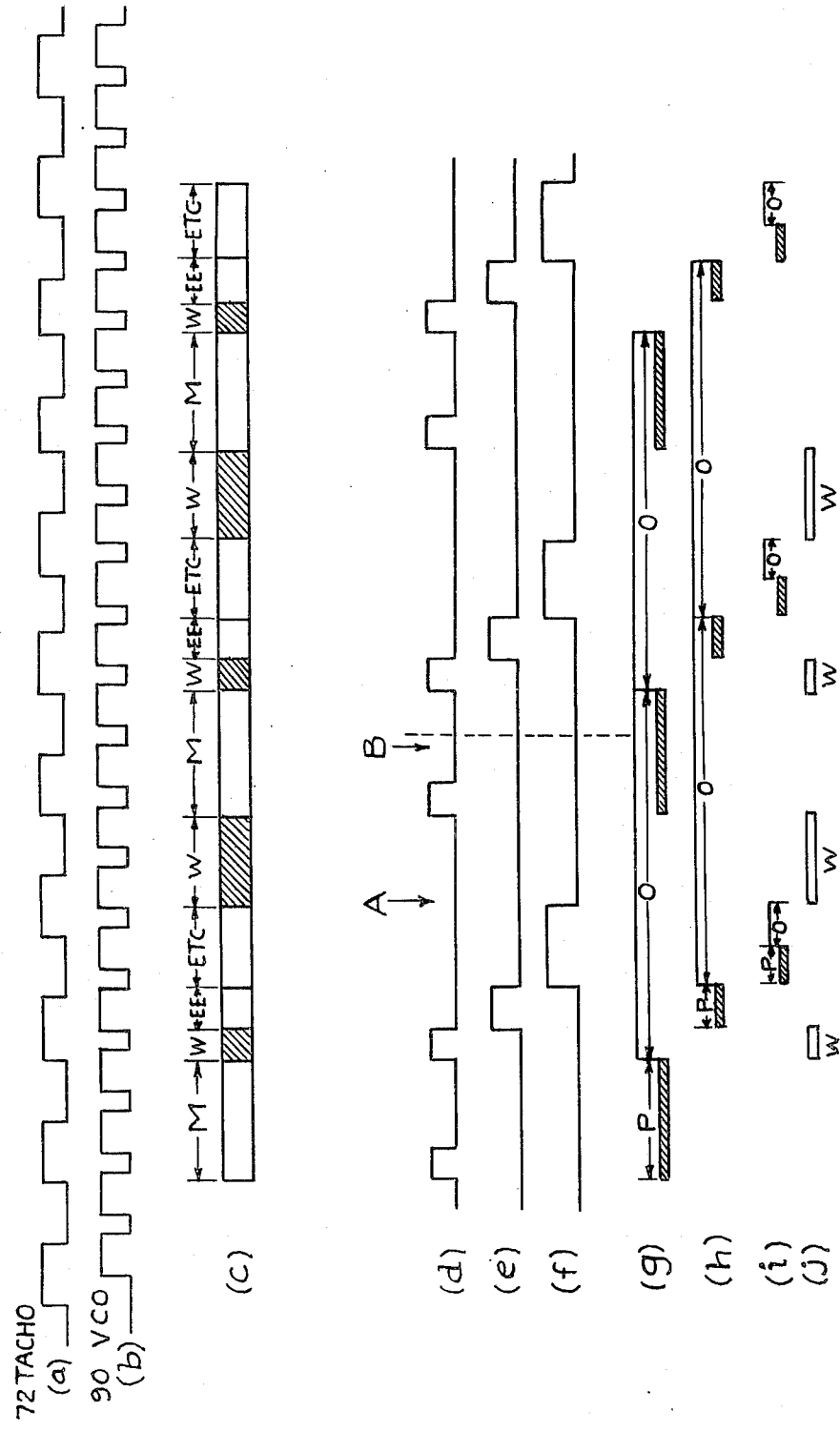

The aforementioned control functions while capable of being performed separately and independently by the CPU 40 and CPU 60 can also be accomplished by utilizing a time sharing system. In FIGS. 9(a) and (b), the respective wave forms from the tachometer 72 and the VCO 90 are illustrated. In the time sharing system, and referring now to FIG. 9(c), the motor control M occurs first, then a waiting or separation time W, then exposure control time represented by EE, and then other functions to be controlled as represented by the time slot ETC. Thus, a repetitive time sharing multiplex cycle is provided with the time control information for each of the functions occurring during the respective time slots.

Considering the control of the motor speeds during the time slot M, as shown in FIG. 9(d) and corresponds to the tachometer signal in FIG. 9(a), calculations are performed in the period P of FIG. 9(g) and outputting is accomplished during the period O of FIG. 9(g). The exposure control is accomplished as shown in FIGS. 9(e) and (h) and the additional function controls are performed as shown in FIGS. 9(f) and (i). FIG. 9(j) represents the waiting time W which corresponds to the waiting time W in FIG. 9(c). In a time sharing system, as shown by reference arrow B, when the ETC time slot of the basic camera finishes but the motor control M does not occur during the appropriate time interval, the phase of the input pulse of the motor control is not correctly sensed. To avoid such error, the motor control is arranged to be accomplished at a point represented by reference arrow A.

The foregoing detailed description has been given for clearness of understanding only and no unnecessary limitations should be understood therefrom as some modifications will be obvious to those skilled in the art.

We claim:

1. A modular camera system, comprising:
   A basic operation camera including a camera housing, an image forming optical system, an image focal plane arrangement and having basic imaging and camera functions; and,
   a selectively attachable and connectable module for providing additional camera and imaging function controls, said module including module control means for controlling the operation of said basic camera concerning predetermined camera and imaging functions when said module is attached to said basic camera, said module including means for changing at least one of said basic imaging and camera functions.

2. The modular camera system of claim 1 wherein said basic camera includes basic camera control means, said basic camera control means including a central processor unit, said module control means including a central processor unit, said basic control means further comprising means being actuated upon attachment of said module for interconnecting said module control means and said basic camera control means whereby said basic camera control means controls the operation of said basic camera when said module is not attached to said basic camera and said module control means controls the operation of said basic camera when said module is attached to said basic camera.

3. The modular camera system of claim 1 wherein said module control means controls all imaging and camera functions of said basic cameras.

4. A modular camera system, comprising:
   a basic camera including a camera housing, an image forming optical system, an image focal plane arrangement and having basic imaging and camera functions;
   said basic camera including digital control means and said module control means includes a digital microprocessor; and,
   a selectively attachable and connectable module for providing additional camera and imaging function controls, said module including module control means for controlling the operation of said basic camera concerning predetermined camera and imaging functions when said module is attached to said basic camera.

5. The modular camera system of claim 1 wherein said module camera and imaging functions include automatic focusing and variable exposure or illumination level control.

6. The modular camera system of claim 1 wherein said module camera and imaging functions include film feed rate control.

7. The modular camera system of claim 1 wherein said module camera includes sound recording means and said module camera and imaging functions include audio level control.

8. The modular camera system of claim 1 wherein said module camera includes means for effecting a lap dissolve.

9. The modular camera system of claim 1 wherein said basic camera is operable with each of a plurality of different modules one at a time upon attachment of each of said modules, each of said different modules including different predetermined imaging and camera functions.

10. The modular camera system of claim 2 wherein said central processor units operate on a time shared basis to control said camera and imaging functions.

11. A modular camera system, comprising:
a basic camera including a camera housing, an image forming optical system, an image focal plane arrangement and having basic imaging and camera functions;
a selectively attachable and connectable module for providing additional camera and imaging function controls, said module including module control means for controlling the operation of said basic camera concerning predetermined camera and imaging functions when said module is attached to said basic camera; and,
said basic camera including film transport drive means for controlling the transport of film at a predetermined rate, said module control means including module film control means for controlling the operation of said film transport drive means.

12. The module camera system of claim 11 wherein said film drive transport means includes encoder means for generating a signal representing the rate of said film drive transport means, said film transport drive means including first digital calculating means responsive to said encoder means for digitally measuring the rate of operation of said film transport drive means, said module control means including second digital calculating means responsive to said encoder means upon attachment to said basic camera for digitally measuring the rate of operation of said film transport drive means, said rate of operation of said film transport drive means being controlled at said predetermined film feed rate by said first digital calculating means when said module is not attached and connected to said basic camera, said rate of operation of said film transport drive means being controlled by said second digital calculating means when said module is attached and connected to said basic camera.

13. The modular camera system of claim 12 wherein said first digital calculating means is responsive to said second digital calculating means when said module is attached and connected.

14. The module camera system of claim 13 wherein said module includes programmable and selectable film feed rate parameters and said second digital calculating means comprises means responsive to said encoder means for modifying said encoder film feed rate signal in accordance with said film feed parameters, said modified encoder film feed rate signal being connected to said first digital calculating means, said modified encoder film feed rate signal corresponding to said predetermined film feed rate.

15. The modular camera system of claim 1 wherein said basic camera includes automatic exposure control means, said module including module exposure function means for controlling said automatic exposure control means when said module is attached and connected to said basic camera.

16. A modular camera system, comprising:
an operation camera including a camera housing, an image forming optical system, an image focal plane arrangement and having basic imaging and camera functions;
a selectively attachable and connectable module for providing additional camera and imaging function controls, said module including module control means for controlling the operation of said basic camera concerning predetermined camera and imaging functions when said module is attached to said basic camera, said module including means for changing at least one of said basic imaging and camera functions;
said basic camera including automatic exposure control means, said module including module exposure function means for controlling said automatic exposure control means when said module is attached and connected to said basic camera, said automatic exposure control means including exposure encoder means for generating a signal representing the luminous intensity at the image focal pulse, said basic camera including first digital calculating means for digitally measuring said luminous intensity signal, said module control means including exposure control inputs and second digital calculating means for digitally measuring said luminous intensity signal, said first digital calculating means controlling the operation of said automatic exposure control means at a predetermined exposure level when said module is not attached and connected to said basic camera, said second digital calculating means controlling said automatic exposure control means when said module is attached and connected to said basic camera in accordance with the setting of said exposure control inputs and predetermined parameters of said module control means.

* * * * *